(12) United States Patent
Sharivker et al.

(10) Patent No.: US 8,243,757 B2
(45) Date of Patent: Aug. 14, 2012

(54) MAC HEADER COMPRESSION USING A POINTER

(75) Inventors: Ofer Sharivker, RaAnana (IL); Haggai Mizrahi, Petach-Tikva (IL)

(73) Assignee: Ceragon Networks Ltd., Tel-Aviv (IL)

( * ) Notice: Subject to any disclaimer, the term of this patent is extended or adjusted under 35 U.S.C. 154(b) by 0 days.

(21) Appl. No.: 12/452,499

(22) PCT Filed: Jul. 3, 2008

(86) PCT No.: PCT/IL2008/000919
§ 371 (c)(1),
(2), (4) Date: Jan. 5, 2010

(87) PCT Pub. No.: WO2009/004631
PCT Pub. Date: Jan. 8, 2009

(65) Prior Publication Data
US 2010/0142560 A1  Jun. 10, 2010

(51) Int. Cl.
*H04L 29/00* (2006.01)
(52) U.S. Cl. .................. 370/477; 370/392
(58) Field of Classification Search .......... 370/393, 370/470–472, 395.31, 475–477, 252, 392, 370/412, 389, 419; 709/247, 245
See application file for complete search history.

(56) References Cited

U.S. PATENT DOCUMENTS

| | | | |
|---|---|---|---|
| 5,363,499 A * | 11/1994 | Glass | 711/108 |
| 6,061,366 A | 5/2000 | Seki et al. | |
| 6,275,406 B1 * | 8/2001 | Gibson et al. | 365/49.17 |
| 6,438,123 B1 | 8/2002 | Chapman | |
| 7,046,672 B2 * | 5/2006 | Liao et al. | 370/395.1 |
| 7,277,426 B2 * | 10/2007 | Brown | 370/383 |
| 7,468,975 B1 * | 12/2008 | Davis | 370/389 |
| 7,817,549 B1 * | 10/2010 | Kasralikar et al. | 370/232 |
| 2004/0071096 A1 | 4/2004 | Na et al. | |

(Continued)

FOREIGN PATENT DOCUMENTS

WO  WO 2009/004631  1/2009

OTHER PUBLICATIONS

International Preliminary Report on Patentability Dated Oct. 28, 2009 From the International Preliminary Examining Authority Re.: Application No. PCT/IL2008/000919.

(Continued)

*Primary Examiner* — Kibrom T Hailu
*Assistant Examiner* — Benjamin Lamont

(57) ABSTRACT

A transmitter for transmitting data packets including a Media Access Control (MAC) address extractor configured to extract one or more MAC addresses from packet headers included in data packets, a MAC compression unit configured to provide compressed MAC data including one or more pointers associated with each of the one or more extracted MAC addresses respectively, a packet modifier configured to modify the data packets by adding the compressed MAC data to the data packets, and a transmission unit configured to transmit the modified data packets. A receiver for receiving data packets including compressed MAC data, the compressed MAC data including pointers associated with MAC addresses, including a receiving unit configured to receive data packets, a compressed MAC data extractor configured to find and extract compressed MAC data from received data packets, and a packet modifier configured to modify the received data packets by removing the compressed MAC data from the received data packet. Related apparatus and methods are also described.

25 Claims, 10 Drawing Sheets

U.S. PATENT DOCUMENTS

2005/0002265 A1     1/2005   Cassiers et al.
2007/0047583 A1*   3/2007   Assa et al. .................... 370/471

OTHER PUBLICATIONS

International Search Report Dated Nov. 4, 2008 From the International Searching Authority Re.: Application No. PCT/IL2008/000919.

Written Opinion Dated Nov. 4, 2008 From the International Searching Authority Re.: Application No. PCT/IL2008/000919.

Degermark et al. "IP Header Compression", Request for Comments: 2507, Standards Track, Lulea University of Technology/SICS, IETF Standard, Internet Engineering Task Force, IETF, XP015008290, p. 1-47, Feb. 1, 1999. Sections 1, 3, 3.1, 3.3.1, 3.3.2, 3.3.3, 5.1, 5.3, 5.3.1, 5.3.2, 6, 10.2.

Kwon et al. "Enhancement of IEEE 802.15.3 High Rate WPAN Via MAC Header Compression", 24th IEEE International Performance, Computing, and Communications Conference, IPCCC 2005, Phoenix, AZ, USA Apr. 7-9, 2005, XP010812734, p. 629-630, Apr. 7, 2005.

* cited by examiner

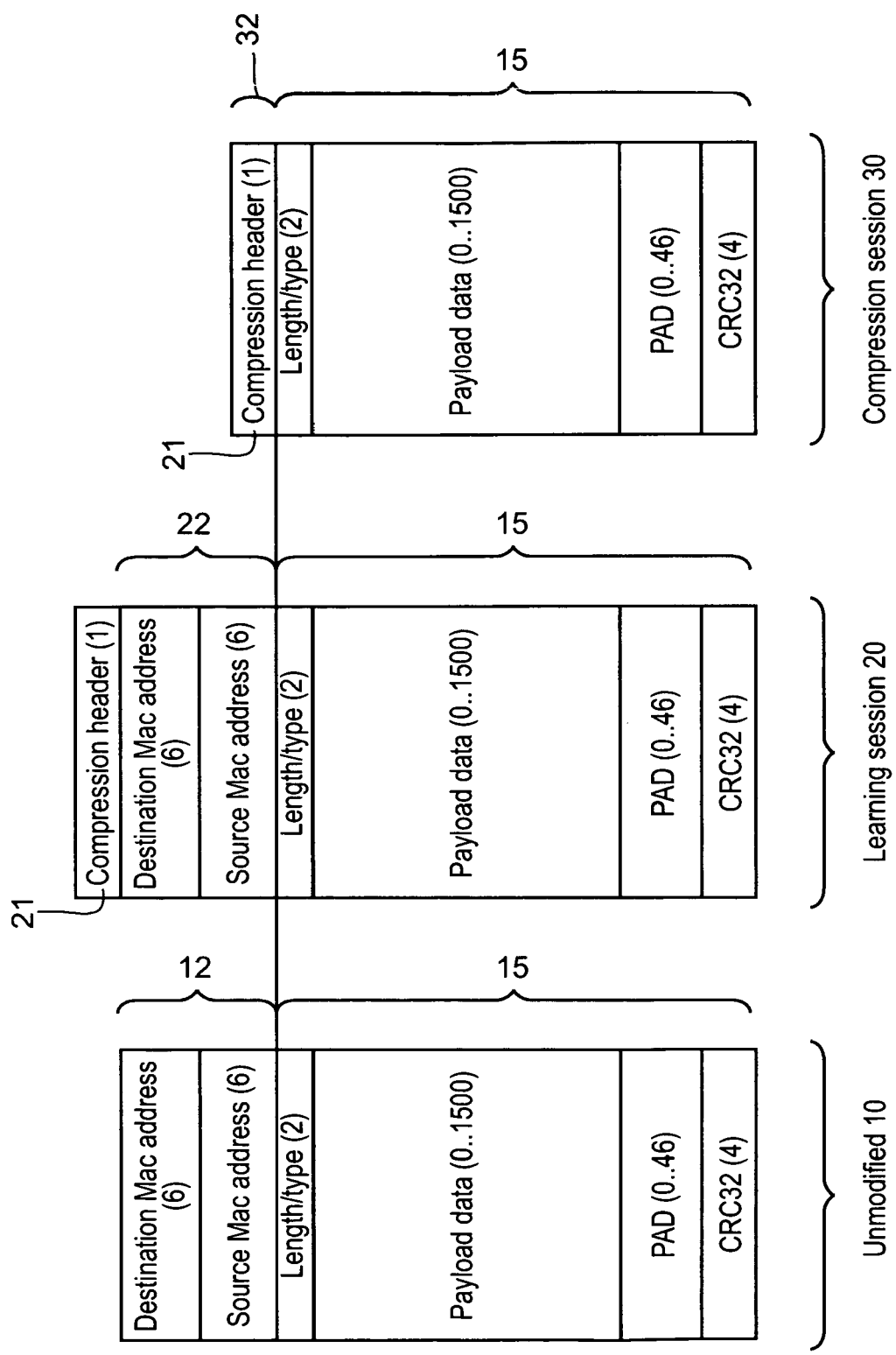

MAC HEADER COMPRESSION USING A POINTER

RELATED APPLICATIONS

The Application is a National Phase of PCT Patent Application No. PCT/IL2008/000919, having International filing date of Jul. 3, 2008, which claims the benefit U.S. Provisional Patent Application No. 60/929,592 filed on Jul. 5, 2007. The contents of the above Applications are all incorporated herein by reference.

FIELD OF THE INVENTION

The present invention relates to compression of data packet headers, and particularly, but not exclusively, to a method and apparatus for Media Access Control (MAC) address compression.

BACKGROUND OF THE INVENTION

Transmissions in networks which employ a mix of different types of links are often restricted to the lowest bandwidth part of the transmission path, which thus acts as a bottleneck. In networks which employ a mix of radio transmission links and wire based links, radio transmission links are often bottlenecks.

One of the main challenges in radio transmission is achieving as much traffic capacity as is possible. Radio transmission, when compared to fiber optic transmission and other line-based transmission links, has a limited bandwidth. When it comes to radio-based Ethernet protocol transmissions, the number of packets that can be transmitted through radio transmission is limited by a maximum radio channel capacity, and the limitation greatly influences performance of the overall network.

Radio transmission of data also poses additional problems, in particular noise, which causes data errors. Digital data packets which have errors typically require a receiver to request retransmission, and a transmitter to retransmit the data packets. Errors thus add to data traffic on the network, lowering the effective bandwidth of the network.

One method of passing more data through a bottleneck is by compressing the data. Persons skilled in the art will appreciate that data packet payload can be compressed independently of data packet headers. Data packet headers typically contain routing data, such as MAC addresses, which is important for routing nodes in a network. Therefore data packet headers are typically not compressed. Data packet headers can be compressed if the routing data is not needed. For example, in point to point transmission, data packet headers can be compressed by a transmitter of the point to point link, and uncompressed by the receiver of the point to point link. The data packet headers are typically compressed separately from the payload because they are needed at different points of the transmission process.

Today, most compression methods, such as described in RFC2507 and RFC3095, deal with both IP header compression and payload compression.

Persons skilled in the art will appreciate that IP headers are part of the third layer of the seven layer OSI Basic Reference Model, termed the network layer, while MAC addresses are part of the second layer of the seven layer OSI Basic Reference Model, termed the data link layer. IP header compression is at a higher level of abstraction than MAC header compression. Different layers serve different purposes in the transmission process and their corresponding data are needed at different times.

The following references are believed to represent a state of the art:
US Published Patent Application 2005/0249222 of van Kampen et al; and
PCT Published Patent Application WO 01/67676 of Luminous Networks Inc. (US).
Various drawbacks of the state of the art are listed herein.
US Published Patent Application 2005/0249222 of van Kampen et al describes a fixed compression of a 6 byte MAC address to less than 6 bytes, using a look up table for translating a MAC address to a short representation thereof. The look up table applies to data packets comprised in an aggregated data frame. Producing an aggregate frame comprised of several data packets requires an especially large memory buffer, increases latency in a network, and, in noisy transmission links increases a probability of losing the entire aggregated frame due to transmission errors.

The disclosures of all references mentioned above and throughout the present specification, as well as the disclosures of all references mentioned in those references, are hereby incorporated herein by reference.

SUMMARY OF THE INVENTION

The present invention seeks to provide a method and apparatus for reducing required bandwidth for transmitting a data packet. Reducing the bandwidth required per packet translates to an improvement in capacity of a transmission channel.

The suggested capacity improvement is based on compressing data packet header fields, such as MAC addresses, typically found in data packet headers.

An advantage of MAC address compression is that MAC address compression can be a supplement to other compression methods, and does not affect a network, except by improving traffic performance.

The term "packet" in all its forms is used throughout the present specification and claims interchangeably with the term "data packet" and its corresponding forms, and with the term "frame" and its corresponding forms.

According to one aspect of the present invention there is provided a transmitter for transmitting data packets including a Media Access Control (MAC) address extractor configured to extract one or more MAC addresses from packet headers included in data packets, a MAC compression unit configured to provide compressed MAC data including one or more pointers associated with each of the one or more extracted MAC addresses respectively, a packet modifier configured to modify the data packets by adding the compressed MAC data to the data packets, and a transmission unit configured to transmit the modified data packets.

According to another aspect of the present invention there is provided a receiver for receiving data packets including compressed Media Access Control (MAC) data, the compressed MAC data including pointers associated with MAC addresses, including a receiving unit configured to receive data packets, a compressed MAC data extractor configured to find and extract compressed MAC data from received data packets, and a packet modifier configured to modify the received data packets by removing the compressed MAC data from the received data packet.

According to yet another aspect of the present invention there is provided a system for transmitting and receiving data packets, including a Media Access Control (MAC) address extractor configured to extract one or more MAC addresses from packet headers included in data packets, a MAC compression unit configured to provide compressed MAC data including one or more pointers associated with each of the one or more extracted MAC addresses respectively, an output packet modifier configured to modify the data packets by adding the compressed MAC data to the data packets, a transmission unit configured to transmit the modified data packets, a receiving unit configured to receive the modified data packets, a compressed MAC data extractor configured to find and extract the compressed MAC data from the received modified data packets, and an input packet modifier configured to modify the received modified data packets by removing the compressed MAC data from the received modified data packets.

According to another aspect of the present invention there is provided a method for transmitting data packets including compressed Media Access Control (MAC) data, including extracting one or more MAC addresses from packet headers included in the data packets, providing compressed MAC data including one or more pointers associated with each of the one or more extracted MAC addresses respectively, modifying the data packets by adding the compressed MAC data to the data packets, and transmitting the modified data packets.

According to yet another aspect of the present invention there is provided a method for receiving data packets including compressed Media Access Control (MAC) data, the compressed MAC data including pointers associated with MAC addresses, including receiving the data packets, extracting the compressed MAC data from the received data packets, and modifying the received data packets by removing the compressed MAC data from the received data packets.

According to another aspect of the present invention there is provided a method for point to point transmission of data packets including modifying and transmitting modified data packets by extracting one or more MAC addresses from packet headers included in data packets, providing compressed MAC data including one or more pointers associated with each of the one or more extracted MAC addresses respectively, modifying the data packets by adding the compressed MAC data to the data packets, and transmitting the modified data packets, and receiving and modifying the modified data packets by receiving the modified data packets, extracting the compressed MAC data from the received modified data packets, and modifying the received modified data packets by removing the compressed MAC data in the received modified data packets, thereby producing twice-modified data packets substantially equal to the data packets.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified pictorial comparison of an unmodified Ethernet MAC frame, to a learning session Ethernet MAC frame, and to a compression session Ethernet MAC frame, operative in accordance with an embodiment of the present invention.

DESCRIPTION OF PREFERRED EMBODIMENTS

Figure 1B:
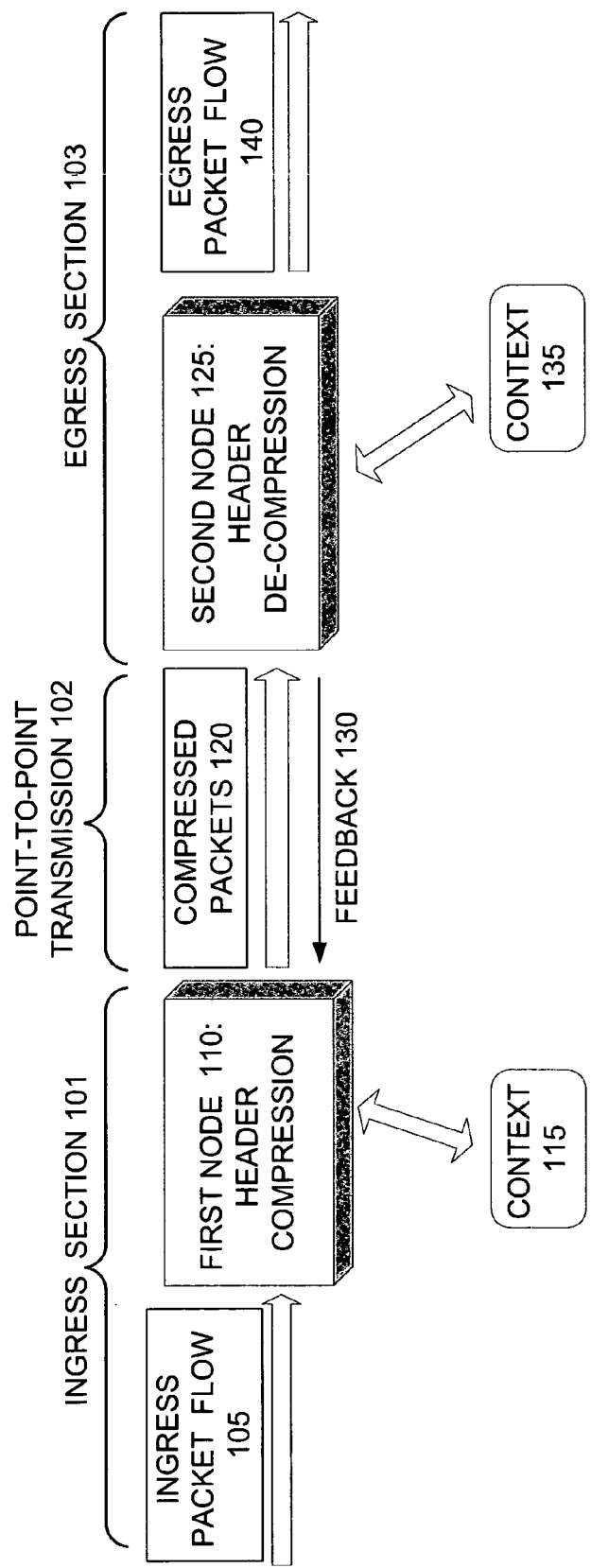
FIG. 1B is a simplified pictorial illustration of point to point transmission operative in accordance with an embodiment of the present invention.

The present embodiments comprise an apparatus and a method for compression of data packet headers by modifying Media Access Control (MAC) addresses typically found in the data packet headers. The method can be applied in point to point transmission of modified data packets from a first node to a second node in a network. The modifying is performed in a way which does not interfere with other compression methods, does not affect network traffic outside the point to point section between the nodes, and provides better traffic performance.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

It is to be appreciated that point to point transmission is different from LAN transmissions. During point to point transmission from a first node to a second node it is possible to temporarily drop, compress, and make other modifications to the source and destination addresses contained within data packets transmitted from the first node to the second node. After all, the source and destination of the point to point transmission are known, the source is the first node, and the destination is the second node.

If the point to point transmission system is but one link in a network, and if the data transmitted in the point to point transmission is to be transmitted by the second node to a network which requires the source and destination addresses, then the first node can modify the source and destination addresses and the second node can reconstruct the addresses.

It is to be appreciated that MAC address compression is performed at the second layer of the seven layer OSI Basic Reference Model, and preferably does not interfere with higher layers. The second layer is session-less, and data packet modification is performed on a packet by packet basis.

Data packet header compression uses a concept of flow context. Flow is defined herein as packets sent from a first node in a network to a second node in the network. A flow context is defined herein as a collection of packet header field values, and pointers to the packet header field values. The flow context is preferably formed both at the first node and at the second node.

It is to be appreciated that many data packet headers are comprised of mostly identical data. It is beneficial to remove the identical data from at least some data packets at the first node, provided the second node can add the identical data back into the packets. The removing and the adding-back are performed based on the first node and the second node having a common flow context.

For example, a native Ethernet MAC frame format contains the fields listed below in Table 1, each of the fields being of a size also listed in Table 1.

TABLE 1

NATIVE ETHERNET MAC FRAME FORMAT

| FIELD | FIELD SIZE (OCTETS) |
| --- | --- |
| Destination Address | 6 |
| Source Address | 6 |
| Length/Type | 2 |
| Payload Data | 0 . . . 1500 |
| PAD | 0 . . . 46 |
| CRC32 | 4 |

The term "octet" in all its forms is used throughout the present specification and claims interchangeably with the term "byte" and its corresponding forms, and both terms are used herein as meaning 8 bits.

An embodiment of the present invention produces a flow context by producing a table of MAC data, comprising full MAC addresses, and associating a pointer to a row in the table with each MAC address. The value of the pointer to a MAC address is the row number of the MAC address within the table of MAC data.

Taking a non-limiting example of a table of MAC data having 8 rows, the 8 rows being typically represented by a three bit number, a compression header for a modified Ethernet MAC frame is produced, with fields as listed in Table 2 below. The compression header is sent from the first node to the second node, and is used to build a flow context in the second node, using data produced by the first node.

TABLE 2

AN EXAMPLE COMPRESSION HEADER

| BIT | FIELD | DESCRIPTION |
| --- | --- | --- |
| 2 . . . 0 | Source pointer | Source address pointer |
| 5 . . . 3 | Destination pointer | Destination address pointer |
| 6 | S | Set to '0' to indicate a learning session, in which an egress unit needs to store the source address according to the source pointer. Set to '1' to indicate a compression session, in which an egress unit needs to reconstruct the source address according to the source pointer. |
| 7 | D | Set to '0' to indicate a learning session, in which an egress unit needs to store the destination address according to the destination pointer. Set to '1' to indicate a compression session, in which an egress unit needs to reconstruct the destination address according to the destination pointer. |

It is to be appreciated that the compression header contains information about one source MAC address and one destination MAC address, both of which are the source and destination MAC addresses of the Ethernet MAC frame. Flow context is gradually and automatically established, both in the first node and in the second node, by information about such pairs of MAC addresses.

The compression header is added to the native Ethernet MAC frame to form a modified Ethernet MAC frame. The modified Ethernet MAC frame comprises both the compression header and the source and destination MAC addresses, enabling the second node to establish a flow context. The modified Ethernet MAC frame described above is a learning session data packet.

Once flow context containing the source and destination MAC addresses has been established, the compression header is still added to the native Ethernet MAC frame, and the source and destination MAC addresses are removed from the native Ethernet MAC frame, producing a compression session data packet.

An example of a modified Ethernet MAC frame in which the 6-octet destination address and the 6-octet source address are removed, and the compression header listed in Table 2 above is added, is listed in Table 3 below.

TABLE 3

A MODIFIED ETHERNET MAC FRAME

| FIELD | FIELD SIZE (OCTETS) |
| --- | --- |
| Compression header | 1 |
| Length/Type | 2 |

TABLE 3-continued

A MODIFIED ETHERNET MAC FRAME

| FIELD | FIELD SIZE (OCTETS) |
|---|---|
| Payload Data | 0 . . . 1500 |
| PAD | 0 . . . 46 |
| CRC32 | 4 |

Persons skilled in the art will appreciate that the table of MAC data having 8 rows is simply an example. It is also possible to have a table of MAC data of a different number of rows, represented by a different number of bits.

Reference is now made to FIG. 1A, which is a simplified pictorial comparison of an unmodified Ethernet MAC frame 10 to a learning session Ethernet MAC frame 20, and to a compression session Ethernet MAC frame 30, operative in accordance with an embodiment of the present invention.

The unmodified Ethernet MAC frame 10 is depicted, comprising fields as described above in Table 1. A name of each field in the unmodified Ethernet MAC frame 10 is shown, and a size of the field is included in parentheses. The unmodified Ethernet MAC frame 10 is divided into two portions, a first portion 12 comprising two MAC address fields, and a second portion 15 comprising a rest of the unmodified Ethernet MAC frame 10.

A modified Ethernet MAC frame as used in a learning session, termed a learning session Ethernet MAC frame 20, is depicted comprising all the fields described above in Table 1, plus a compression header field 21. The names and sizes of the fields are depicted similarly to the depiction in the unmodified Ethernet MAC frame 10. The learning session Ethernet MAC frame 20 is divided into two portions, a first portion 22 comprising two MAC address fields and the compression header 21, and a second portion 15 comprising a rest of the learning session Ethernet MAC frame 20.

It is to be appreciated that the learning session Ethernet MAC frame 20 is identical to the unmodified Ethernet MAC frame 10 except for an addition of the 1-byte compression header 21.

Upon reception of the learning session Ethernet MAC frame 20, the second node stores the destination and source MAC addresses in a MAC data table, in rows numbered according to destination and source pointers included in the compression header 21.

A modified Ethernet MAC frame as used in a compression session, termed a compression session Ethernet MAC frame 30 is depicted, comprising the fields described above in Table 1, less the destination MAC address field and the source MAC address field, plus the compression header field 21. The names and sizes of the fields are depicted similarly to the depiction in the unmodified Ethernet MAC frame 10. The compression session Ethernet MAC frame 30 is divided into two portions, a first portion 32 comprising the compression header 21, and a second portion 15 comprising a rest of the compression session Ethernet MAC frame 30.

It is to be appreciated that the heights of the fields depicted in the first portions 12 22 32 are drawn to according to the sizes of the fields. It is to be appreciated that the heights of the fields in the second portions 15 are not drawn to scale, yet the second portions are all of equal size.

It is to be appreciated that the compression header 21 is not necessarily added at the location in which the compression header 21 is illustrated in each of the depictions of the modified and unmodified Ethernet MAC frames. The location of the illustrations are simply to emphasize that adding a compression header can come at a typical cost of adding 1 byte, while removing two MAC addresses can save 12 bytes at a cost of adding 1 byte.

It is to be appreciated that it is possible to mix a learning session and a compression session, removing only one MAC address, thereby saving 6 bytes at a cost of adding the 1 byte compression adder 21.

Figure 3:
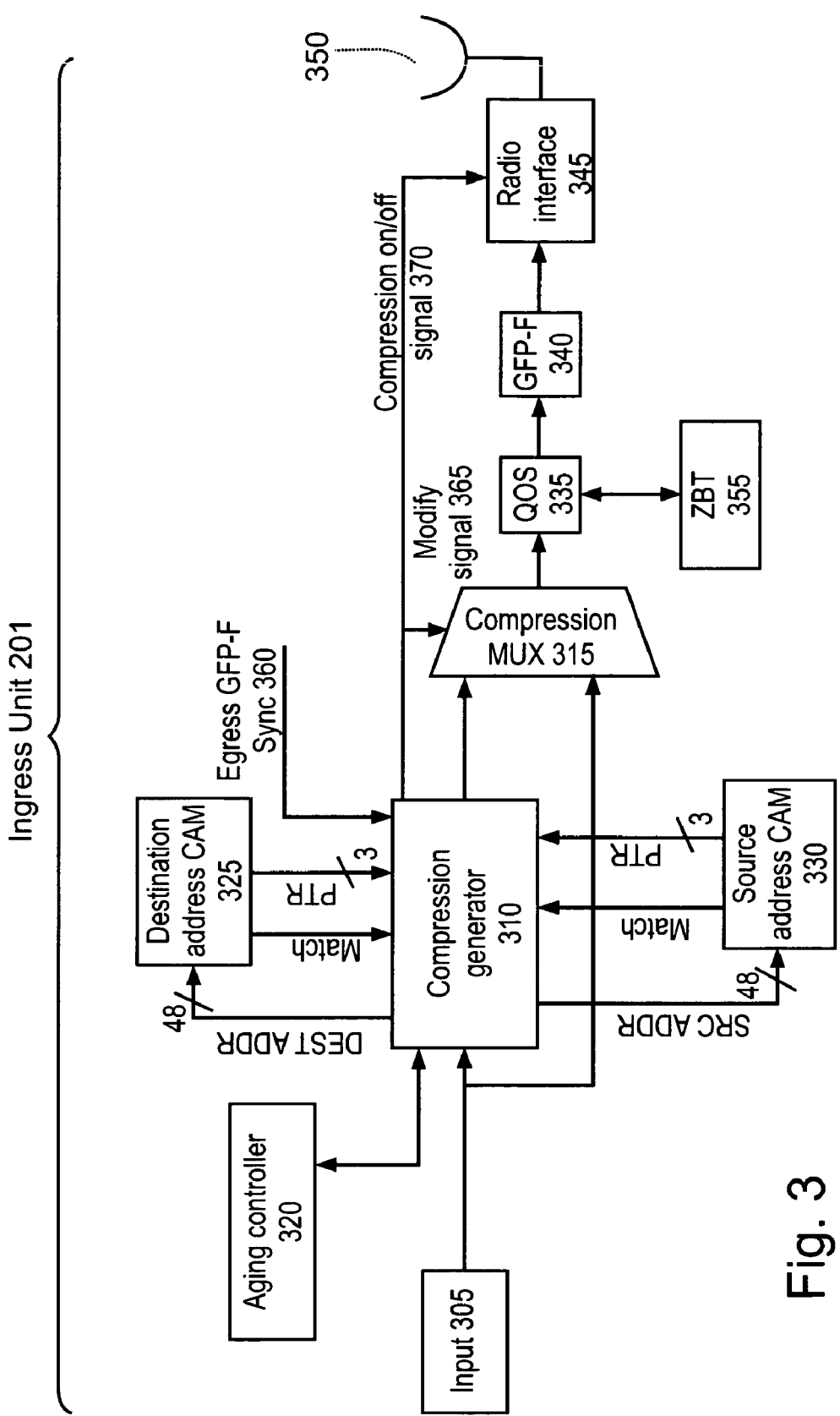
FIG. 3 is a simplified functional block diagram illustration of an ingress unit of the system of FIG. 2.
Figure 5:
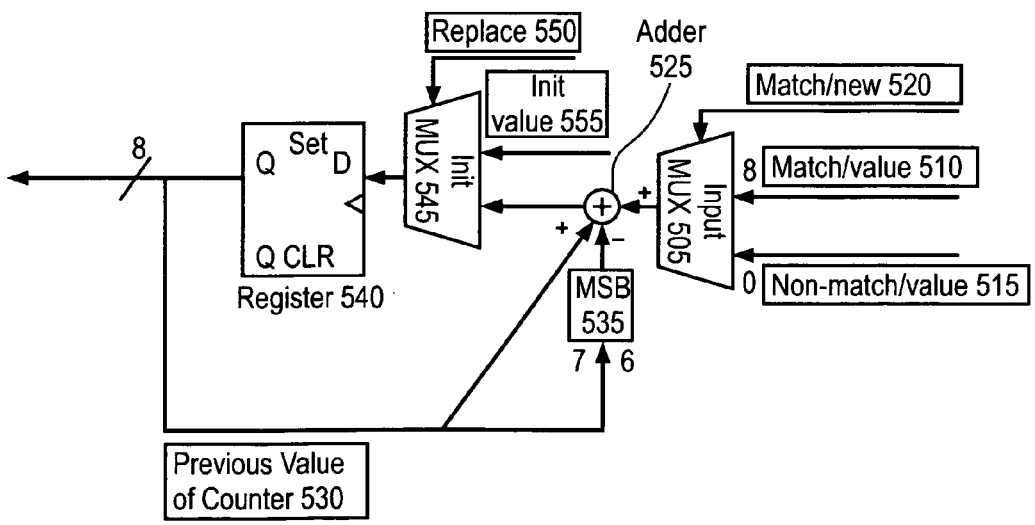
FIG. 5 is a simplified block diagram illustration of a counter in an aging controller in the system of FIG. 2.

It is to be appreciated that it is not necessary to compress all Ethernet MAC frames transmitted in a point to point transmission. If only Ethernet MAC frames containing most commonly used MAC addresses are compressed, in many cases the compression includes a majority of the Ethernet MAC frames, and a significant saving is achieved. An aging mechanism, described below in more detail with reference to FIGS. 3 and 5 provides for maintaining a flow context containing most recently used MAC addresses, thereby dynamically adjusting the flow context to contain substantially most commonly used MAC addresses at any point in time.

A compression factor based on compressing a 26 byte header is displayed in Table 4 below. It is to be appreciated that even without a MAC address match, it is possible to compress the 26 byte header by not including a preamble (not shown in the tables above) in the point to point transmission. The preamble is typically 8 bytes in size.

TABLE 4

HEADER COMPRESSION FACTOR

| | Total header size includes preamble (Bytes) | Minimum compressed header size, without preamble (Bytes) | Compressed header comprises (Bytes) | Compression factor |
|---|---|---|---|---|
| Matched both source and destination address | 26 | 7 | 1 byte compression header<br>2 byte Length/Type<br>4 byte CRC | 74% |
| Matched source or destination address | 26 | 13 | 1 byte compression header<br>2 byte Length/Type<br>6 byte MAC address<br>4 byte CRC | 50% |
| No match | 26 | 19 | 1 byte compression header<br>2 byte Length/Type<br>6 byte MAC address<br>6 byte MAC address<br>4 byte CRC | 27% |

A calculated performance gain obtained by using header compression operative in accordance with an embodiment of the present invention is listed in Table 5 below. Table 5 was calculated assuming a header comprising a 6 byte destination address, 6 byte source address, 2 byte length/type field, and 4 byte CRC32 field.

TABLE 5

PERFORMANCE GAIN

| Packet length in bytes, including header and CRC32 field | Maximum throughput, no compression (Mbps) | Maximum throughput with compression, including preamble compression (Mbps) | Gain |
| --- | --- | --- | --- |
| 64 | 345 | 553 | 38% |
| 128 | 352 | 454 | 23% |
| 256 | 356 | 407 | 13% |

First packets of a new flow are used to build the flow context at both nodes.

The first packets are sent without header compression. The number of the first few packets, which are initially sent uncompressed, can be related to transmission link characteristics such as, for example, Bit Error Rate (BER) and round trip time. Transmission of just one packet is enough to establish a flow context which contains source and destination addresses associated with the packet. Once a flow context is established at both nodes, the first node compresses the packet headers.

In an embodiment of the present invention, one packet is used to establish the flow context, and subsequent packets use a compressed header. It is to be appreciated that even under relatively noisy transmission conditions, such as a bit error rate of $10^{-9}$, the likelihood that a header and a compression header, which are used to establish the flow context, will be affected by noise is substantially low.

In an alternative embodiment of the present invention, more than one packet is used to establish the flow context. The second node compares the destination address, source address, destination pointer, and source pointer of the packets, and establishes the flow context if the addresses and pointers of the packets are respectively equal.

In yet another alternative embodiment of the present invention, the second node compares the addresses and the pointers, and establishes the flow context based on a majority of each of the addresses and pointers. Thus, for example, if an error in a one packet affects an address or a pointers, and three packets are used to establish the flow context, two out of three addresses or pointers will be without error and equal, and the erroneous address or pointer will be outvoted by the two to one.

In another alternative embodiment of the present invention, account is taken of link conditions, and the number of packets used to establish the flow context is based, at least partly, on Bit Error Rate (BER) of the transmission link.

In yet another alternative embodiment of the present invention, account is taken of feedback from the second node, and the number of packets used to establish the flow context is based, at least partly, on the feedback.

In case of errors, in order to recover, the first node transmits packets with both uncompressed headers and compression headers, in order to reconstruct the flow context, and then reverts to normal operational mode, which is sending packets with compressed headers.

Reference is now made to FIG. 1B, which is a simplified pictorial illustration of point to point transmission operative in accordance with an embodiment of the present invention.

FIG. 1B comprises an ingress section 101, which illustrates an ingress packet flow 105 into a point to point transmission 102, and an egress section 103, which illustrates an egress packet flow 140 exiting the point to point transmission 102.

The ingress packet flow 105 enters a first node 110. The first node 110 performs header compression by removing one or more MAC addresses in data packets of the ingress packet flow, and by adding data associated with the MAC addresses, the data added being shorter than the MAC addresses, thereby producing modified data packets. The data associated with the MAC addresses is termed herein compressed MAC data, since it is shorter than full MAC addresses. The production of short data associated with MAC addresses will be described in more detail below with reference to Table 2.

The removing and the adding are performed based on a first flow context 115. The first flow context 115 typically comprises a table of MAC addresses.

The first node 110 typically removes MAC addresses from the data packets, and adds pointers to rows in the table of MAC addresses in which the respective MAC addresses are stored. The data packets thereby use less bits to represent MAC addresses, and are termed compressed packets 120. The compressed packets 120 are transmitted to a second node 125.

The second node 125 decompresses the compressed packets 120 by removing the row numbers inserted by the first node 110, and adding complete MAC addresses stored in a second flow context 135. It is to be appreciated that the second flow context 135 is substantially identical to the first flow context 115. The decompressed data packets produce the egress packet flow 140, comprising data packets which are substantially unchanged relative to corresponding data packets comprised in the ingress packet flow 105.

In alternative embodiments of the present invention, a feedback path 130 is established between the first node 110 and the second node 125. The feedback path enables the second node 125 to communicate with the first node 110, enabling the first node 110 to take into account link conditions and feedback from the second node 125. An additional non-limiting example of a use for the feedback 130 is in case of error recovery, when uncompressed packets (not shown) are sent from the first node 110 to the second node 125 in order to reconstruct the second flow context 135.

The operation illustrated in FIG. 1B will now be described in more detail.

Figure 2:
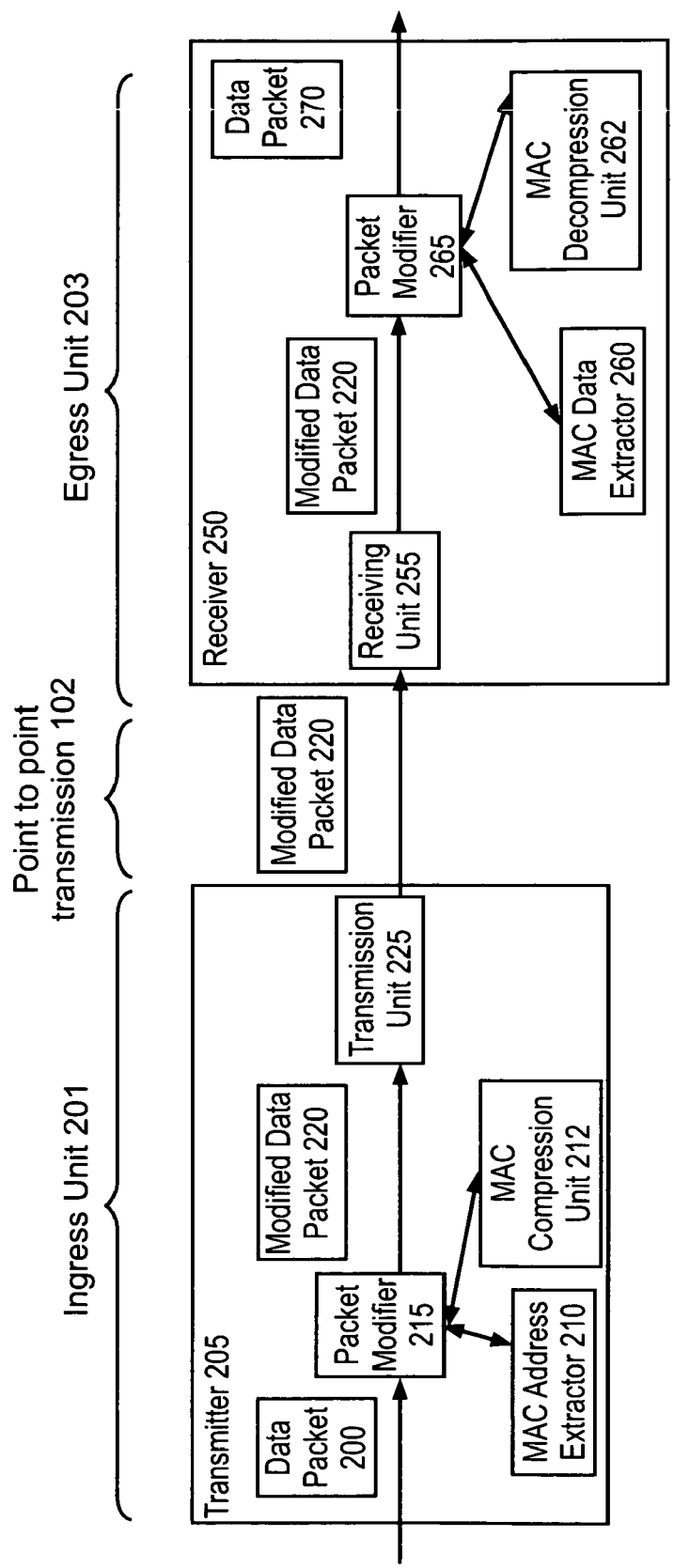
FIG. 2 is a simplified pictorial illustration of a system operative in accordance with an embodiment of the present invention.

Reference is now made to FIG. 2, which is a simplified pictorial illustration of a system operative in accordance with an embodiment of the present invention.

FIG. 2 depicts an ingress unit 201 implementing the operation of the ingress section 101 (FIG. 1B), the point to point transmission 102 to an egress unit 203, and the operation of the egress section 103 (FIG. 1B).

A transmitter 205 receives a data packet 200, which is to be transmitted as a modified data packet 220 with a compressed MAC address. The data packet is transferred to a packet modifier 215 for modification. A MAC address extractor 210 comprised in the transmitter 205 extracts MAC addresses comprised in the data packet 200. The MAC address extractor 210 provides the MAC address to the packet modifier 215, and the packet modifier 215 modifies the data packet 200 by removing the MAC address in the packet header and adding compressed MAC data corresponding to the MAC address, thereby producing a modified data packet 220. The compressed MAC data will be described in more detail below with reference to FIGS. 3 and 4.

The modified data packet 220 is provided to a transmission unit 225, which transmits the modified data packet 220. Persons skilled in the art will appreciate that the modified data packet 220 is preferably a smaller data packet than the unmodified data packet 200, and is termed a compressed packet, corresponding to the compressed packets 120 of FIG. 1B.

It is to be appreciated that the transmission by the transmission unit 225 is typically expected to be over a bottleneck section of a transmission path, for example, a wireless radio section. Other examples of bottleneck sections of a transmission path can be a section of Ethernet over electric home wiring, Ethernet over power lines, and so on.

The modified data packet 220 is received by a receiving unit 255 comprised in a receiver 250 and transferred to a packet modifier 265. A MAC address extractor 260 comprised in the receiver 250 extracts the compressed MAC data comprised in the modified data packet 220. The MAC address extractor 260 provides the compressed MAC data to the packet modifier 265, and the packet modifier 265 modifies the modified data packet 220 by removing the compressed MAC data and adding the MAC addresses corresponding to the compressed MAC data, thereby producing a data packet 270. The data packet 270 is substantially identical to the data packet 200 in the transmitter 205.

Persons skilled in the art will appreciate that the transmission unit 225 can be a transmitting/receiving unit operating in a transmitting mode, and that the receiving unit 255 can be a transmitting/receiving unit operating in a receiving mode, and that the two transmitting/receiving units can be identical.

Persons skilled in the art will appreciate that the MAC address extractor 210 in the transmitter 205 and the MAC address extractor 260 in the receiver 250 perform similar functions, and can be identical units performing the respective functions.

In an alternative embodiment of the present invention a single extracting unit is produced, which performs a extracting function similar to that of the MAC address extractor 210 in the transmitter 205 when employed in transmitter mode, and performs a extracting function similar to that of the MAC address extractor 260 in the receiver 250 when employed in receiving mode.

In yet another alternative embodiment of the present invention, a single transmitter/receiver is produced, which performs a transmitting function similar to that of the transmitter 205 when employed in transmitter mode, and performs a receiving function similar to that of the receiver 250 when employed in receiving mode.

In an embodiment of the present invention, the transmitter 205 comprises a MAC compression unit 212 and the receiver 250 comprises a MAC decompression unit 262, both configured to store a table of MAC data. The table of MAC data contains MAC addresses from data packets which are flowing through the transmitter 205 and the receiver 250. The MAC compression unit of the transmitter 205 corresponds to the first flow context 115 of FIG. 1B, and the MAC compression unit of the receiver 250 corresponds to the second flow context 135 of FIG. 1B. Each table of MAC data stores one MAC address per row, and produces compressed MAC data corresponding to a stored MAC address by providing a row number which corresponds to the stored MAC address.

The system of FIG. 2 operates in different modes of operation when the system is in different states. Some of the modes of operation will now be described.

A Learning Session:

When a data packet arrives at a first node, the data packet comprises a source and a destination MAC address. If the source and the destination MAC addresses are both not contained in a flow context of the first node, the first node initiates a learning session. A compression header is produced, comprising the fields of Table 2, with "S"="0" and "D"="0". The compression header is added to the data packet, and the full MAC addresses remain in the data packet. The data packet, thus modified, is sent to a second node.

The second node receives the modified data packet, and uses the contents of the data packet to reconstruct the data packet as it was before modification, and to update a flow context of the second node.

In order to reconstruct the data packet as it was before modification, the second node removes the compression header from the received modified data packet.

In order to first establish, and subsequently update, the flow context of the second node, the second node extracts a source pointer and a destination pointer from the compression header, and the source MAC address and the destination MAC address from the data packet. The source pointer value is associated with the source MAC address, and the destination pointer is associated with the destination MAC address thereby establishing a common context flow.

A Compression Session:

After sending a data packet for establishing a common flow context between the first node and the second node, when the first node needs to transmit a data packet comprising MAC addresses within the established common flow context, the first node can initiate a compression session. The first node produces a compression header, comprising the fields of Table 2, with "S"="1" and "D"="1". The compression header is added to the data packet, and the full MAC addresses are removed from the data packet. The data packet, thus modified, is sent to the second node.

The second node receives the modified data packet, and uses the contents of the data packet to reconstruct a data packet substantially equal to the data packet of the first node before modification.

The second node removes the compression header from the received modified data packet, and reads the compression header, providing values for a source pointer, and a destination pointer. The second node retrieves the source MAC address associated with the source pointer, and the destination MAC address associated with the destination pointer, and adds the MAC addresses to the received modified data packet. The received data packet, thus modified, is substantially identical to the data packet of the first node before modification.

It is to be appreciated that more than one data packet can be sent in a learning session associated with a source MAC address and a destination MAC address. If more than one data packet is sent establishing the same flow context, then data may be reinforced, making the compression more reliable. Thus errors due to noise in the first packet can be overcome.

A Mixed Session:

It is to be appreciated that a compression session can be established wherein only one of the source MAC address and the destination MAC address is removed. In such a case the first node produces a compression header comprising both a source pointer and a destination pointer, one of the pointers being to an already established MAC address, a second pointer being to a newly established MAC address. One of the "D" and "S" fields, corresponding to the already established MAC address, is set to equal "1", and another of the "D" and "S" fields, corresponding to the newly established MAC address, is set to equal "0". The first node also removes the already established MAC address from the packet header, and transmits the modified packet to the second node.

The second node removes the compression header, adds a MAC address corresponding to the pointer having a corresponding "S" or "D" value of "1" to the data packet, and associates the source or destination pointer corresponding to the "S" or "D" value of "0" with a MAC address comprised in the packet header, thereby updating the flow context of the second node.

In an alternative embodiment of the present invention, a header CRC field comprised in packet headers is used, and the "D" and "S" fields of Table 2 are not used. The compression header is thus two bits shorter, or else the two bits are added to the source pointer field and to the destination pointer field. The flow context update and the data packet modifications are performed as described below.

In a learning session, the first node produces a compression header without the "D" and "S" fields, and adds the compression header to the data packet without removing the source and destination MAC addresses. The second node removes the compression header from the received data packet, producing a modified received packet, and performs a Cyclic Redundancy Check (CRC) on the header of the modified received packet. If the CRC produces a value equal to the header CRC field of the modified received packet, the modified received packet is presumed identical to the data packet prior to modification by the first node, and therefore must comprise two full MAC addresses in the packet header. The second node thereby identifies the data packet reception as belonging to a learning session, extracts two pointers from the compression header, and associates the two pointers with corresponding MAC addresses from the received data packet, thereby updating the flow context.

In a compression session, the first node produces a compression header without the "D" and "S" fields, adds the compression header to the data packet, and additionally removes the source and destination MAC addresses from the data packet. The second node removes the compression header from the received data packet, producing a modified received packet, and performs a CRC on the packet header of the modified received packet. In such a case the CRC should produce a value not equal to the header CRC field of the modified received packet, since the modified received packet header does not contain the source and destination MAC addresses. The second node uses values of the source pointer and the destination pointer from the compression header to retrieve associated source and destination MAC addresses, and add the source and destination MAC addresses to the received data packet. After removing the compression header and adding the source and destination MAC addresses, the header CRC field should be equal to the CRC of the packet header of the modified received data packet, indicating that the packet header of the modified received packet is substantially identical to the packet header of the data packet of the first node, before modification.

Reference is now made to FIG. 3, which is a simplified functional block diagram illustration of an ingress unit 201 of the system of FIG. 2.

The ingress unit 201 comprises an input 305, a compression generator 310, a compression mux (multiplexer) 315, an aging controller 320, a destination address Content Addressable Memory (CAM) 325, a source address CAM 330, a Quality of Service (QoS) unit 335, a Generic Frame Procedure-Frame (GFP-F) unit 340, a radio interface 345, a radio 350, and a Zero Bus Turnaround (ZBT) memory 355.

The above components of the ingress unit 201 are connected as follows. The input 305 is connected and provides input to the compression generator 310 and directly to the compression mux 315. The compression generator 310 is bi-directionally connected to the aging controller 320, the destination address CAM 325, the source address CAM 330, and is connected and provides output to the compression mux 315. The compression mux 315 is connected to and provides input to the QoS unit 335. The QoS unit 335 is also bi-directionally connected to the ZBT memory 355. The QoS unit 335 is connected to, and provides output to, the GFP-F unit 340, which is connected to and provides output to the radio interface 345, which is connected to and provides output to the radio 350.

The operation of the ingress unit 201 will now be described in more detail.

Data packets are sent from the input 305 to the compression generator 310, and directly to the compression mux 315.

The compression generator 310 extracts MAC addresses from the data packets, and sends a destination MAC address to the destination address CAM 325, a source MAC address to the source address CAM 330, and both the source MAC address and the destination MAC address to the aging controller 320.

Persons skilled in the art will appreciate that the source MAC address and the destination MAC address are, according to a present standard, each 48 bits, or 6 bytes, long.

It is to be appreciated that in an alternative embodiment of the present invention the destination address CAM 325 and the source address CAM 330 are embodied in one CAM (not shown).

The destination address CAM 325 sends the compression generator 310 an indication whether the destination MAC address has matched a MAC address stored in the destination address CAM 325. If there has been a match, the destination address CAM 325 also sends a pointer corresponding to the destination MAC address. According to the above-mentioned non-limiting example of a CAM comprising a table of 8 rows, the pointer is 3 bits long.

The source address CAM 330 sends the compression generator 310 a suitable match indication and a suitable pointer, as described above with reference to the destination address CAM 325.

The compression generator 310, based at least in part on match indications, on pointers provided by the destination address CAM 325 and the source address CAM 330, on input from the aging controller 320, and on input from an egress GFP-F (Frame-mapped GFP) sync signal 360, prepares a modified data packet which is used to replace an input data packet.

The compression generator 310 sends the modified data packet to the compression mux 315.

The compression generator 310 selects whether to modify the input packet according to a learning session or according to a compression session, based, at least in part, on the match from the destination address CAM 325, the match from the source address CAM 330, and the input from the aging controller 320.

In case of a compression session, the compression generator 310 produces a modify signal 365, and sends the modify signal 365 to the compression mux 315, and produces a compression on/off signal 370, and sends the compression on/off signal 370 to the radio interface 345.

In case of a learning session, the compression generator 310 does not send the modify signal 365 to the compression mux 315, and produces a compression on/off signal 370, and sends the compression on/off signal 370 to the radio interface 345.

The compression mux 315, according to the modify signal 365, either sends the modified data packet to the QoS unit 335, or sends the data packets received directly from the input 305, to the QoS unit 335.

It is to be appreciated that the ingress unit 201 can operate in a non-compression mode, in which a data packet input via the input 305 is not modified, and is transferred directly to the compression mux 315.

The QoS unit 335 uses the ZBT memory 355 to store the data packet received from the compression mux 315, and produces output of data packets which are sent to a GFP-F unit 340.

The GFP-F unit 340 produces a frame synchronization header for each data packet and produces output of the data packets, including the frame synchronization header, which is sent to the radio interface 345. The radio interface 345 additionally accepts input of the compression on/off signal 370 sent by the compression generator 310, and produces an output to be transmitted by the radio 350.

In an alternative embodiment of the present invention, the ingress unit 201 begins a compression session only after receipt of an assertion of egress GFP-F synchronization signal. Until the signal is received, only learning sessions are allowed.

In yet another alternative embodiment of the present invention, the ingress unit 201 begins a compression session only after a radio link between the ingress unit and the egress unit operates in a suitably reliable transmission channel, such as an errorless transmission link. For example, in a case where ACM (Adaptive Code Modulation) is used to overcome changes in quality of the transmission link, the ingress unit 201 begins a compression session only after ACM condition is not at a minimum constellation, or is at least above a configurable minimum constellation. Until such a condition is achieved, only learning sessions are allowed.

Once assertion of Egress GFP-F sync has occurred, and preferably also when a error rate (MSE, or Mean Square Error) below a suitable threshold is reached, the ingress unit 201 is in a state to potentially compress packet headers.

Upon arrival of MAC addresses, the compression generator 310 sends the destination and the source MAC addresses to the respective CAMs 325 330. If there is no match for the destination and source MAC addresses the MAC addresses are stored at the respective CAMs 325 330 according to the aging mechanism, as will be described below with reference to the aging controller 320, and a suitable compression header is produced. The above is an instance of a learning session.

If there is a match for one or both of the destination and source MAC addresses, the compression generator 310 issues a compression on/off signal 370 in a state of "on", the "D" and "S" fields of the compression header are set to "1" for each matched source and destination MAC address respectively, and the header fields "source pointer" and "destination pointer" are set with respective CAM pointers. The above is an instance of a compression session.

In an alternative embodiment of the present invention the compression ingress unit additionally comprises a MAC match counter (not shown). The match counter counts how many learning session packets are sent with respect to each MAC address. The compression generator 310 switches from a learning session to a compression session for a particular MAC address when the MAC match counter has counted N or more matches. N is typically 1. In yet another alternative embodiment of the present invention N is based, at least partly, on the error rate of the transmission link.

The ingress unit 201 sends to an egress unit (not shown) a compression on/off indication via the radio interface 345. For example, one way of sending the compression on/off indication is packaged in the data packet as SDH (Synchronous Digital Hierarchy) Overhead, according to the SDH standard. The compression on/off indication indicates to the egress unit whether a compression header is present in a transmitted data packet.

In an alternative embodiment of the present invention the ingress unit 201 does not transmit a data packet using compression session mode before receiving feedback from the egress unit 203 (FIG. 2) that context flow has been established for the MAC addresses included in the data packet.

In yet another alternative embodiment of the present invention, the ingress unit 201 sends the first flow context 115 (FIG. 1B), in a data packet comprising the contents of the destination address CAM 325 and the source address CAM 330, to the egress unit 203. The above-mentioned flow context is sent either as data added to a data packet, or as a separate service data packet. The egress unit 203 receives the above-mentioned flow context and replaces the second flow context 135 (FIG. 1B) with the received flow context.

Operation of a CAM with reference to the system of FIG. 2 will now be described in more detail.

Figure 4:
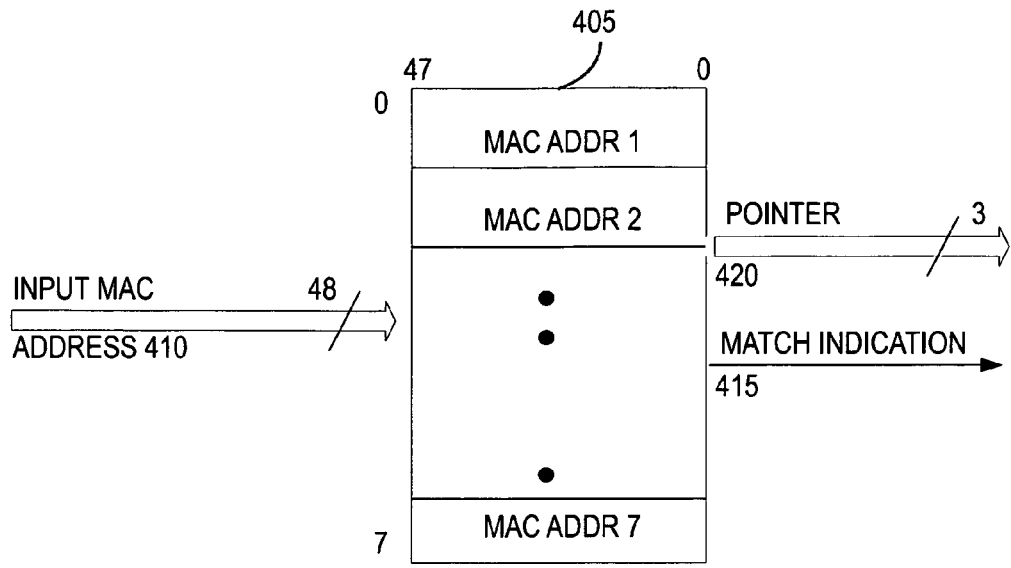
FIG. 4 is a simplified pictorial illustration of Content Addressable Memory in the system of FIG. 2.

Flow Context:

Reference is now made to FIG. 4, which is a simplified pictorial illustration of Content Addressable Memory in the system of FIG. 2.

A CAM 405 comprises, by way of example, 8 rows of 48 bits each. The eight rows are for storing 48 bit MAC addresses, which is a MAC address size according to current specification. When a 48 bit input MAC address 410 is presented as input to the CAM 405, the CAM 405 produces output in one of two forms. If a match has been made, a match indication 415 is output indicating the match, and a pointer 420 is output indicating in which row the input MAC address 410 is matched in the CAM 405. If a match has not been made, the match indicator 415 indicates that a match has not been made, and no pointer 420 is output.

The pointer 420, according to the non-limiting example described above, is only 3 bits long.

Persons skilled in the art will appreciate that the CAM 405 can indicate absence of a match by outputting a pointer which is out of range of the CAM 405, such as, for example, a pointer with a negative value, thereby enabling a CAM with one output. Alternatively, the CAM 405 can refrain from producing a match indicator in absence of a match.

It is to be appreciated that the CAM 405 comprises a table with MAC address fields, and that the table can comprise additional fields. For example, if egress unit 203 (FIG. 2) provides feedback on storing a MAC address, the receiving of the feedback can be stored in a row corresponding to the MAC address. For example, a value of a use counter such as will be further described below with reference to aging, can be stored in a row corresponding to the MAC address.

In an alternative embodiment of the present invention the MAC address table of the CAM 405 stores MAC address pairs, comprising one destination MAC address and one source MAC address. The compression header of Table 2 stores one pointer and one 1-bit flag. Learning sessions refer to new destination MAC address—source MAC address pairs, and compression sessions remove both of the MAC addresses. Conducting packet header compression according to destination MAC address—source MAC address pairs can provide advantages, some non-limiting examples being a saving in CAM units, and providing better compression, under suitable circumstances.

Aging:

The aging controller 320 (FIG. 3) is responsible for finding a least frequently used MAC address stored in the destinations address CAM 325 and source address CAM 330. The least frequently used MAC address is a candidate to be erased, in case an address CAM is full and a new MAC address needs to be stored therein.

Operation of the aging controller 320 will now be described in more detail.

Counters corresponding to each CAM row are provided, each counter representing a status of one CAM entry.

Every time a new data packet arrives with a MAC address which has no match, all counters are decremented, for example, by 63/64.

Every time a new data packet arrives with a MAC address matching a CAM entry, and also when the MAC address is first stored in one of the CAMs, a corresponding counter is incremented, for example by 63/64+8.

The time between arrival of data packets is used to select a lowest value counter from the counters associated with a CAM.

The incrementing and decrementing is defined more accurately in Equation 1 below:

$$cnt_n = cnt_{n-1} - \left[\frac{cnt_{n-1}}{64}\right] + [8*x] \quad \text{Equation 1}$$

where $cnt_n$ is a value of a counter n upon arrival of a corresponding MAC address, $cnt_{n-1}$ is a previous value of the counter n, x=1 if match or new entry, and x=0 if no match.

It is to be appreciated that Equation 1 above is an example, and the decrementing and incrementing factors can be adjusted to suit.

In an alternative embodiment of the present invention, implementation of Equation 1 is simplified by using Equation 2 below:

$$cnt_n = cnt_{n-1} - 1 + [8*x] \quad \text{Equation 2}$$

where $cnt_n$ is a value of a counter n upon arrival of a corresponding MAC address, $cnt_{n-1}$ is a previous value of the counter n, x=1 if match or new entry, and x=0 if no match.

Persons skilled in the art will appreciate that the value of cnt needs to start with some initial value, and that giving cnt the initial value is not described in Equations 1 and 2 above. The value of cnt may also occasionally be replaced by some initial value, possibly equal to a starting initial value, and possibly different from the starting initial value.

Reference is now made to FIG. 5, which is a simplified block diagram illustration of a counter in an aging controller in the system of FIG. 2.

The aging counter of FIG. 5 comprises an input mux 505, accepting as input two numbers, a match value 510, and a non-match value 515. The input mux 505 also accepts as input a match/new signal 520. If the match/new signal 520 is input to the input mux 505, the input mux 505 outputs the match value 510, else the input mux 505 outputs the non-match value 515.

The input mux 505 is connected to an adder 525, which accepts as input the output of the input mux 505, a previous value 530 of the aging counter, and N most significant bits 535 of the previous value 530. The adder 525 adds the three inputs, thereby generally implementing the function of Equation 1 above.

Persons skilled in the art will appreciate that taking N most significant bits of an 8 bit value corresponds to dividing the value, albeit without keeping a remainder, by $2^{8-N}$.

The adder 525 sends a result of addition, as an output, through an init mux 545, to a register 540, which stores the result. The result is the value of the counter n, to be used by the aging controller 320 (FIG. 3).

The init mux 545 typically passes the value received from the adder 525 to the register 540. When the value of the aging counter is to be initialized, as described above, the init mux receives a replace signal 550, and an initial value 555, and outputs the initial value 555 to the register 540 instead of passing the value received from the adder 525.

An embodiment of the present invention uses a match value 510 of 8, a non-match value 515 of 0, takes N=2 most significant bits, thereby exactly implementing the function of Equation 1 above. According to the above-mentioned embodiment, the aging counter provides an output value comprising 8 bits.

In an alternative embodiment of the present invention, mentioned above as implementing Equation 2, the unit providing input of N most significant bits 535 simply provides a fixed input of −1.

Persons skilled in the art will appreciate that the aging counter of FIG. 5 is not limited to the embodiment described above, and can provide more than 8 bit values, can take other than 2 most significant bits, and can have other match and non-match values.

In an alternative embodiment of the present invention the aging controller 320 is absent, and aging functionality is absent.

Restart:

An alternative embodiment of the present invention further comprises a restart unit providing restart functionality. The restart unit clears each CAM entry with more then M matches. If a MAC address corresponding to the cleared CAM entry arrives, a learning session is started. The restart functionality enables an ingress unit to automatically recover from sending data packets with CRC errors, without need for an error correction handshake between the ingress unit 201 (FIG. 3) and an egress unit.

In an embodiment of the present invention M=16. It is to be appreciated that the restart functionality provides robustness against errors in a learning session compression header. Even if an erroneous flow context is established, no more than M packets will be reconstructed with erroneous source or destination addresses.

It is to be appreciated that the restart functionality provides a limit to a negative effect which errors in establishing flow context can have. The restart functionality allows the egress unit not to provide feedback to the ingress unit upon successful establishment of flow context, by limiting the effect that an erroneous flow context can produce. The restart functionality also enables not having a CRC field for detecting errors in the compression header, because errors in the compression header does not affect more than M packets.

It is also to be appreciated that the packets reconstructed with erroneous source or destination addresses will not pass CRC32 check, since they contain errors, and will not be sent to an erroneous destination.

In yet another alternative embodiment of the present invention, restart functionality is absent.

Figure 6:
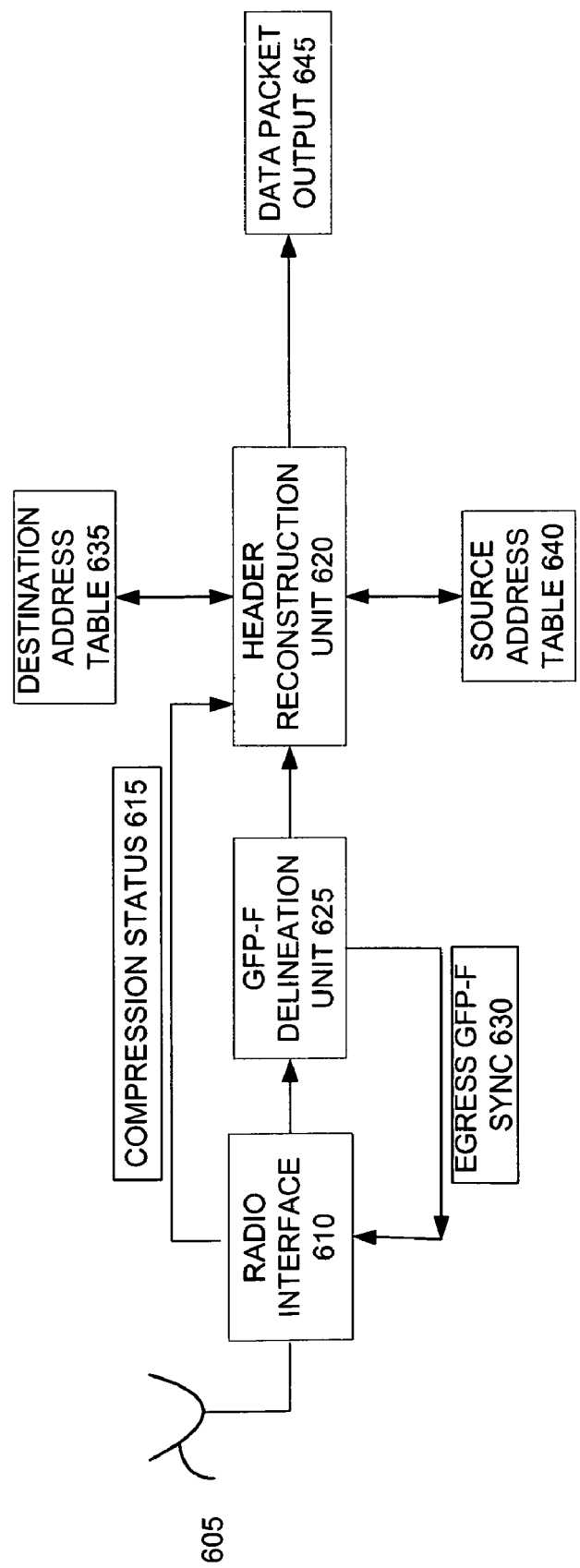
FIG. 6 is a simplified functional block diagram illustration of an egress unit of the system of FIG. 2.

Reference is now made to FIG. 6, which is a simplified functional block diagram illustration of an egress unit 600 of the system of FIG. 2.

The egress unit 600 comprises a radio 605, a radio interface 610, a header reconstruction unit 620, a GFP-F delineation unit 625, a destination address table 635, a source address table 640, and a data packet output 645.

The radio 605 receives point to point transmissions, comprising data packets from the ingress unit 201 (FIG. 2). The radio 605 is connected, and provides the received data packets as input, to the radio interface 610. The antenna also receives signals from the radio interface 610, to transmit to the ingress unit 201, such as, for example, egress GFP-F sync 630.

The radio interface 610 sends the received data packets to the GFP-F delineation unit 625. The radio interface 610 also extracts an indication of compression status 615 from the data packet, and provides the indication of compression status 615 to the header reconstruction unit 620. The indication of compression status 615 is based, at least in part, on an indication sent by the ingress unit 201 (FIG. 3), and more specifically by the radio interface 345 (FIG. 3) of the ingress unit 201, as described above with reference to FIG. 3.

The GFP-F delineation unit 625 produces a GFP-F sync signal 630 for sending back to the ingress unit of FIG. 3. The GFP-F sync signal 630 is based, at least partly, on establishment of GFP-F synchronization by the GFP-F delineation unit 625. The sending is typically done by sending a data packet comprising the GFP-F sync signal 630 via the radio interface 610 and the radio 605.

The GFP-F delineation unit 625 also removes the frame synchronization header from the data packets and sends the data packets to the header reconstruction unit 620.

The header reconstruction unit 620 uses the indication of compression status 615 from the radio interface 610 in order to process compressed incoming data packets differently from uncompressed incoming data packets.

If the indication of compression status 615 indicates a presence of a compression header, the header reconstruction unit 620 uses the "D" and the "S" values in the compressed header to identify which of the MAC addresses is to be retrieved from one of the address tables 635 640 and added to a received data packet, and which of the MAC addresses is to be extracted from the received data packet. Either the source address is to be retrieved, "S"="1", or the destination address is to be retrieved, "D"="1", or both, or neither.

If one or both of the "D" and "S" values are "0", indicating a learning session or a mixed session, the header reconstruction unit 620 stores respective MAC addresses in respective tables 635 640, according to respective destination and source pointers.

The header reconstruction unit 620 sends a value of the destination pointer field of the compression header to a destination address table 635, and a value of the source pointer field of the compression header to a source address table 640, and receives full destination and source MAC addresses respectively. The header reconstruction unit 620 removes the compression header, and adds full MAC addresses to the received data packet, thereby modifying the received data packet.

In an alternative embodiment of the present invention, the header reconstruction unit 620 performs CRC for the modified received data packet, and compares a result of the CRC to a CRC value stored in the modified received data packet. If the CRC result and the CRC value don't match, the header reconstruction unit 620 removes the destination and source MAC addresses and replaces with all possible combinations of destination and source MAC addresses available in the destination address table 635 and the source address table 640, performing a CRC test for each replacement. A modified received data packet which passes the CRC test is presumed to be a valid data packet, and is sent to the data packet output 645. The above-described mechanism enables recovery from errors in source pointer and destination pointer fields in the compression header, without sending a request for re-transmission to the ingress unit 201 (FIGS. 2 and 3). It is to be appreciated that the alternative embodiment described above is particularly useful in an environment with a noisy transmission link.

It is to be appreciated that a data packet which does not pass the CRC test is not sent to its destination, and a data packet does not get sent where it is not meant to arrive.

It is to be appreciated that the radio 605 and the radio 350 (FIG. 3) perform similar functions, and can be identical units performing the respective functions.

It is to be appreciated that the radio interface 610 and the radio interface 345 (FIG. 3) perform similar functions, and can be identical units performing the respective functions.

In an alternative embodiment of the present invention the destination address table 635 and the source address table 640 are embodied in one table.

Some features of the present invention contributing to robustness will now be described in detail.

Error Prevention:

In an embodiment of the present invention, when the egress unit 203 identifies a received packet indicating a learning session, the egress unit 203 performs a CRC test prior to storing a MAC address in the destination address table 635 and the source address table 640. If CRC fails, the received data packet will be discarded, and the MAC address will not be stored, thereby preventing establishment of potentially erroneous flow context.

In an alternative embodiment of the present invention, when the egress unit 203 identifies a received packet indicating a compression session, the egress unit 203 removed the compression header and adds full MAC addresses to a received packet, then performs a CRC test on the modified received packet. If the CRC test fails, the egress unit discards only the failed data packet, and continues receiving other data packets. The mechanism described above prevents dropping other data packets which may have been transmitted by the ingress unit 201, and are "in the pipeline".

It is to be appreciated that if a data packet sent during a learning session is not received, due to noise or errors in the point to point transmission, ingress flow context and egress flow context are not in sync. The above-mentioned restart functionality puts an end to a problem of the ingress flow context and the egress flow context not being in sync after a limited number of packets is transmitted.

It is to be appreciated that feedback from the egress unit 203 (FIGS. 2 and 6) to the ingress unit 201 (FIGS. 2 and 3) can serve to verify flow context and prevent unsynchronized flow context.

Figure 7:
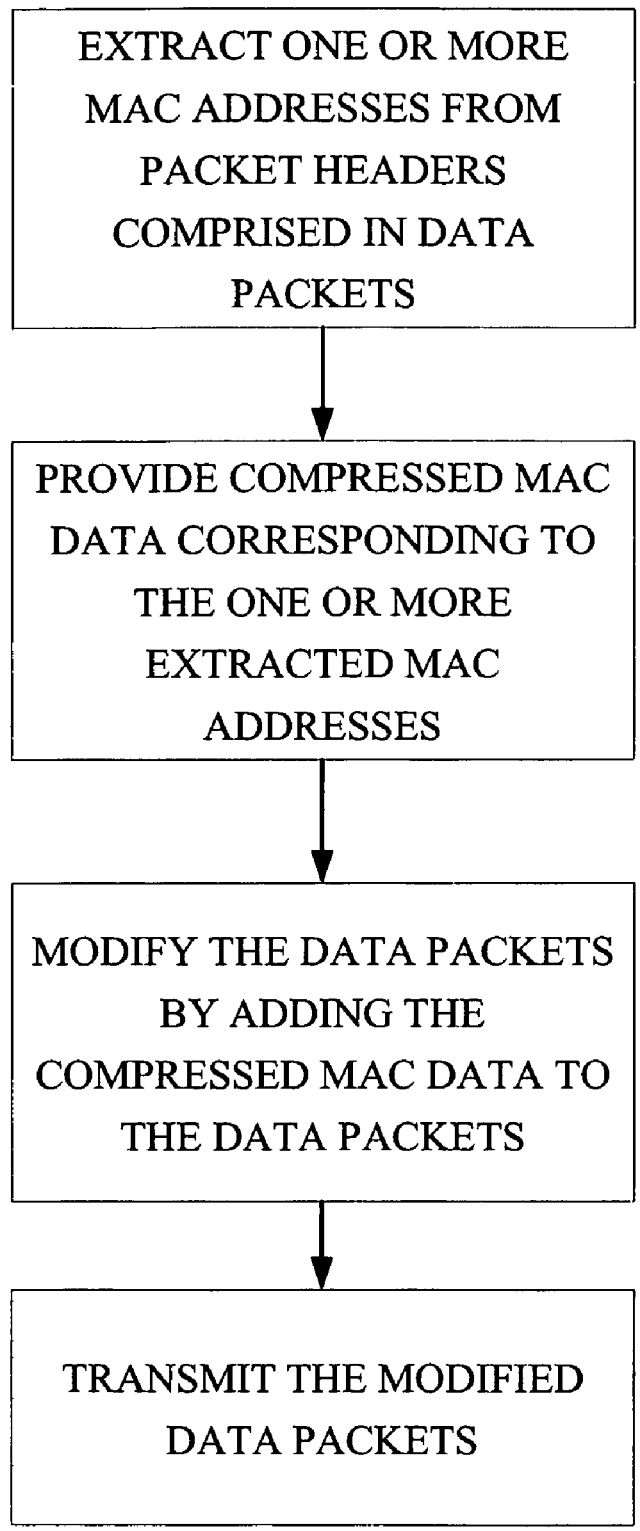
FIG. 7 is a simplified flowchart illustration of a method for transmitting a data packet in a learning session according to the system of FIG. 2.

Reference is now made to FIG. 7, which is a simplified flowchart illustration of a method for transmitting a data packet in a learning session according to the system of FIG. 2. The method of FIG. 7 is self-explanatory in light of the above discussion of FIGS. 2 and 3 and of a learning session.

Figure 8:
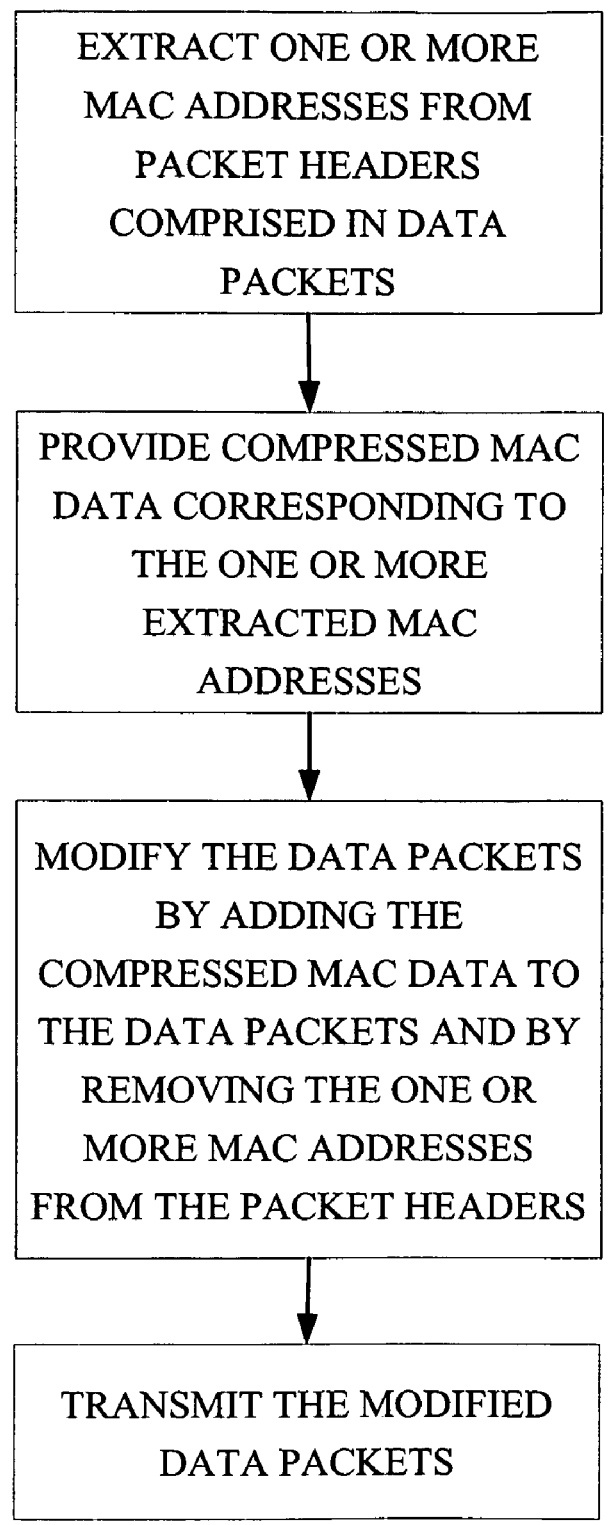
FIG. 8 is a simplified flowchart illustration of a method for transmitting a data packet in a compression session according to the system of FIG. 2.

Reference is now made to FIG. 8, which is a simplified flowchart illustration of a method for transmitting a data packet in a compression session according to the system of FIG. 2. The method of FIG. 8 is self-explanatory in light of the above discussion of FIGS. 2 and 3 and of a compression session.

Figure 9:
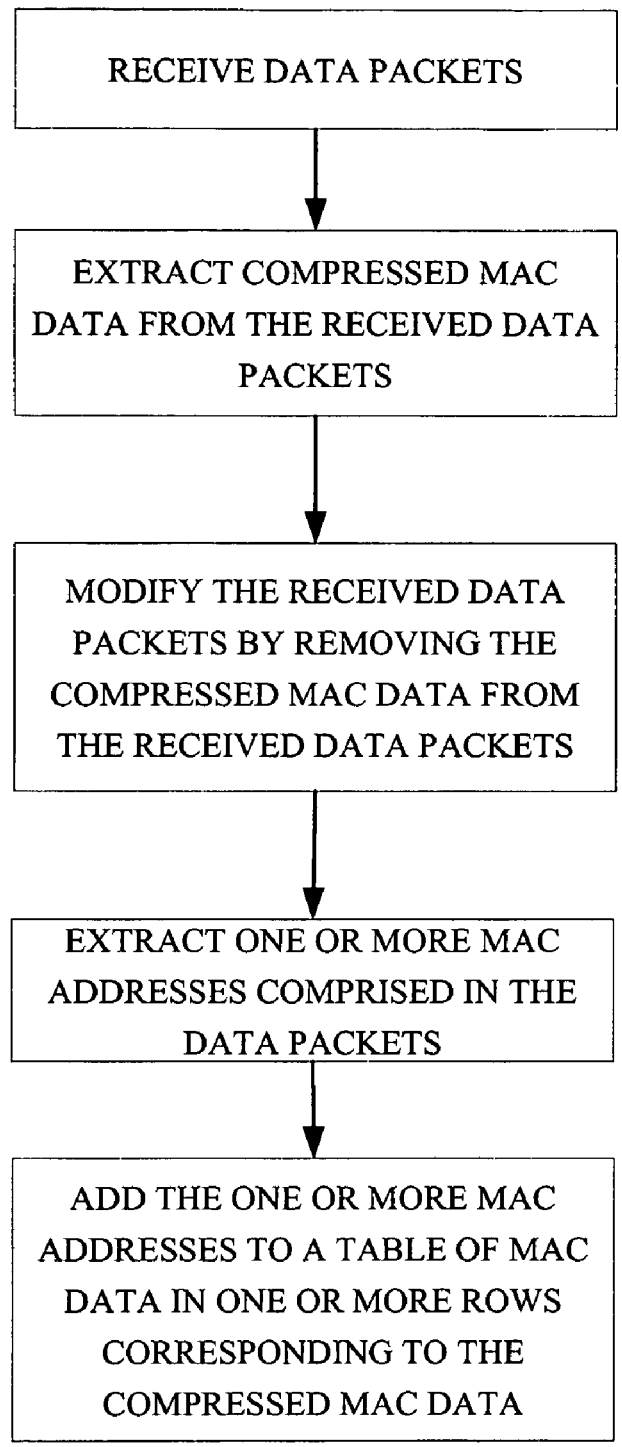
FIG. 9 is a simplified flowchart illustration of a method for receiving a data packet in a learning session according to the system of FIG. 2.

Reference is now made to FIG. 9, which is a simplified flowchart illustration of a method for receiving a data packet in a learning session according to the system of FIG. 2. The method of FIG. 9 is self-explanatory in light of the above discussion of FIGS. 2 and 6 and of a learning session.

Figure 10:
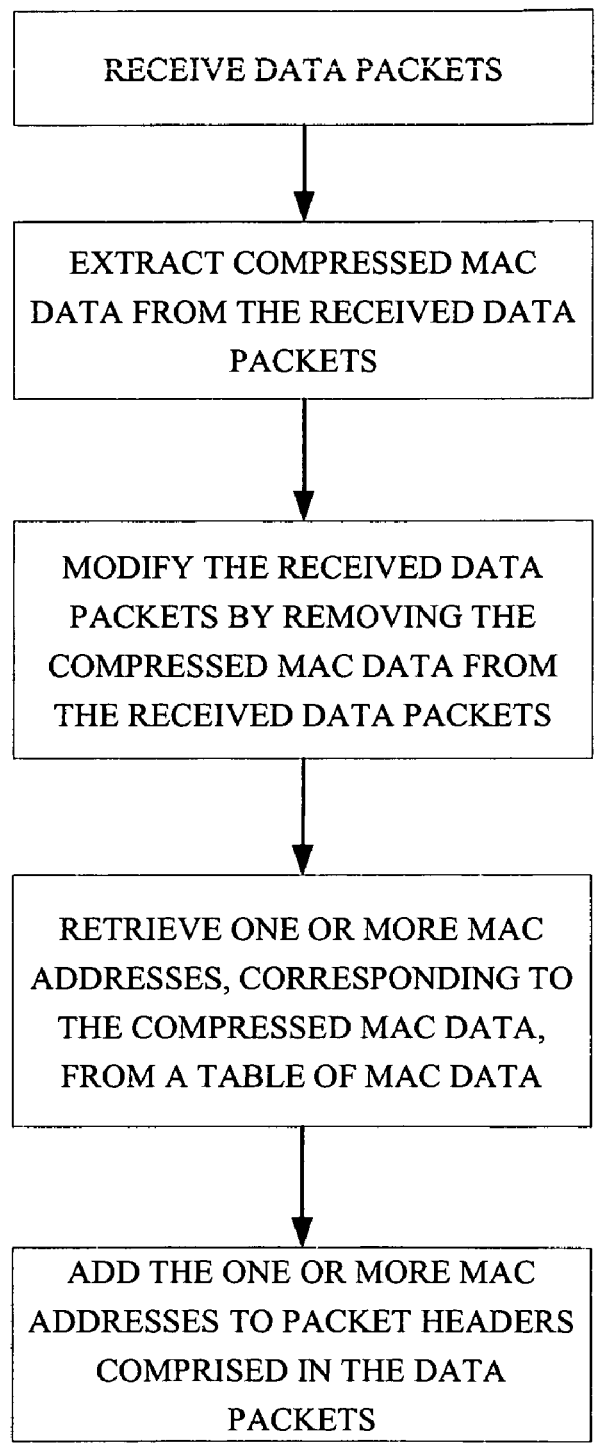
FIG. 10 is a simplified flowchart illustration of a method for receiving a data packet in a compression session according to the system of FIG. 2.

Reference is now made to FIG. 10, which is a simplified flowchart illustration of a method for receiving a data packet in a compression session according to the system of FIG. 2. The method of FIG. 10 is self-explanatory in light of the above discussion of FIGS. 2 and 6 and of a compression session.

It is expected that during the life of this patent many relevant devices and systems will be developed and the scope of the terms herein, particularly of the terms data packet, packet header, frame, MAC address, GFP, Generic Frame Procedure (GFP), and GFP-F, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A transmitter for transmitting data packets comprising:
 a Media Access Control (MAC) address extractor configured to extract one or more MAC addresses from packet headers comprised in data packets;
 a MAC compression unit configured to:
  store a table of MAC data, the MAC data comprising MAC addresses; and
  provide compressed MAC data comprising one or more values associated with each of the one or more extracted MAC addresses respectively, each of the one or more values associated with MAC addresses being a pointer to a row in the table storing a MAC address equal to the respective MAC address;
 a packet modifier configured to modify the data packets by adding the compressed MAC data to the data packets; and
 a transmission unit configured to transmit the modified data packets, wherein:
 the transmitter further comprises a MAC data restart unit comprising a use counter, configured to delete a row of data in the MAC data table after the value associated with the MAC address comprised in the row has been used more than a set plurality of times.

2. The transmitter according to claim 1 and wherein the MAC compression unit comprises a Content Addressable Memory (CAM).

3. The transmitter according to claim 1 and wherein the transmitter is configured to transmit the table of MAC data.

4. The transmitter according to claim 1 and wherein the compressed MAC data does not comprise indicators whether the MAC addresses have been removed from the packet headers.

5. The transmitter according to claim 1 and wherein the packet modifier is further configured to determine, for any given packet, which modification the packet modifier shall use to modify the data packet, from a group consisting of:
 modifying the data packet by adding the compressed MAC data to the data packet without removing at least some corresponding MAC addresses;
 modifying the data packet by adding the compressed MAC data to the data packet and removing one or more of the MAC addresses from the packet header; and
 not modifying the data packet.

6. The transmitter according to claim 5 and wherein the packet modifier is configured to determine which modification to use, based, at least partly, on a count of match indications from the use counter.

7. The transmitter according to claim 5 and wherein the packet modifier is configured to determine which modification to use based, at least partly, on a count of match indications from the use counter, on transmission link characteristics, and on transmission link round trip time.

8. The transmitter according to claim 1 and wherein the transmitter further comprises a MAC data aging unit configured to identify infrequently used MAC addresses as candidates for erasure, and wherein the MAC compression unit is configured to replace a row of the MAC data table comprising an identified infrequently used MAC address with MAC data comprising a new MAC address.

9. The transmitter according to claim 1 and wherein the packet modifier is configured to further modify the data packets by including indicators whether a receiver is to use the compressed MAC data to retrieve the MAC addresses.

10. A transmitter for transmitting data packets comprising:
 a Media Access Control (MAC) address extractor configured to extract one or more MAC addresses from packet headers comprised in data packets;
 a MAC compression unit configured to:
  store a table of MAC data, the MAC data comprising MAC addresses; and
  provide compressed MAC data comprising one or more values associated with each of the one or more extracted MAC addresses respectively, each of the one or more values associated with MAC addresses being a pointer to a row in the table storing a MAC address equal to the respective MAC address;
 a MAC data aging unit configured to identify MAC addresses in the table as candidates for replacement, using counters corresponding to rows in the table;
 a packet modifier configured to modify the data packets by adding the compressed MAC data to the data packets; and
 a transmission unit configured to transmit the modified data packets,
 wherein the MAC compression unit is configured to replace a row of the MAC data table comprising an identified MAC address with a new MAC address according to a data aging method comprising:
 for each transmitted data packet, calculating a new value $cnt_n$ for each counter corresponding to a MAC address in the table of MAC data as follows:

$$cnt_n = cnt_{n-1} - (1/2^N) * cnt_{n-1} + (a \text{ value}) * x$$

where $cnt_{n-1}$ is a previous value of the counter, N is an integer in a range starting at 1 and ending at a number of bits representing the value of $cnt_{n-1}$, and if the transmitted data packet header includes a match for the MAC address x=1, else x=0.

11. The transmitter of claim 10 in which the MAC data aging unit sets a value of 8 for an initial value of a counter corresponding to a newly added MAC address in the table of MAC data.

12. A system for transmitting and receiving data packets, comprising:
a Media Access Control (MAC) address extractor configured to extract one or more MAC addresses from packet headers comprised in data packets;
a MAC compression unit configured to:
store a table of MAC data, the MAC data comprising MAC addresses; and
provide compressed MAC data comprising one or more values associated with each of the one or more extracted MAC addresses respectively, each of the one or more values associated with MAC addresses being a pointer to a row in the table storing a MAC address equal to the respective MAC address;
a MAC data restart unit comprising a use counter, configured to delete a row of data in the MAC data table after the value associated with the MAC address comprised in the row has been used more than a set plurality of times;
an output packet modifier configured to modify the data packets by adding the compressed MAC data to the data packets;
a transmission unit configured to transmit the modified data packets;
a receiving unit configured to receive the modified data packets;
a compressed MAC data extractor configured to find and extract the compressed MAC data from the received modified data packets; and
an input packet modifier configured to modify the received modified data packets by removing the compressed MAC data from the received modified data packets.

13. The system according to claim 12 and wherein:
the output packet modifier is configured to further modify the data packet by removing the MAC addresses from the packet headers;
the system further comprises a MAC decompression unit configured to provide one or more MAC addresses according to the one or more values associated with MAC addresses comprised in the extracted compressed MAC data; and
the input packet modifier is configured to further modify the received modified data packets by adding the one or more MAC addresses to the packet headers of the received modified data packets.

14. A method for transmitting data packets comprising compressed Media Access Control (MAC) data, comprising:
extracting one or more MAC addresses from packet headers comprised in the data packets;
storing a table of MAC data, the MAC data comprising MAC addresses;
providing compressed MAC data comprising one or more values associated with each of the one or more extracted MAC addresses respectively, each of the one or more values associated with MAC addresses being a pointer to a row in the table storing a MAC address equal to the respective MAC address;
modifying the data packets by adding the compressed MAC data to the data packets; and
transmitting the modified data packets,
wherein, after the value associated with the MAC address comprised in the row has been used more than a set plurality of times, deleting a row of data in the MAC data table.

15. The method according to claim 14 and wherein the modifying further comprises removing the one or more MAC addresses from the packet header.

16. The method according to claim 14 and further comprising using Content Addressable Memory (CAM) for storing the table of MAC data and producing the compressed MAC data.

17. The method according to claim 16 and further comprising determining which modification shall be applied to any given data packet, from a group consisting of:
modifying the data packet by adding the compressed MAC data to the data packet without removing at least some corresponding MAC addresses;
modifying the data packet by adding the compressed MAC data to the data packet and removing one or more of the MAC addresses from the packet header; and
not modifying the data packet.

18. The method according to claim 17 and wherein the determining which modification shall be applied to any given data packet is based, at least partly, on a count of match indications of previous data packets comprising the given packet MAC addresses to the MAC addresses stored in the table of MAC data.

19. The method according to claim 17 and wherein the determining which modification shall be applied to any given data packet is based, at least partly, on a count of match indications of previous data packets comprising the given packet MAC addresses to the MAC addresses stored in the table of MAC data, on transmission link characteristics, and on transmission link round trip time.

20. The method according to claim 15 and wherein the modifying further comprises modifying the data packets by including indicators whether a receiver is to use the compressed MAC data to retrieve the MAC addresses.

21. The method according to claim 16 and further comprising transmitting data packets comprising the table of MAC data.

22. The method according to claim 16 and further comprising aging an infrequently used MAC address stored in the table of MAC data by replacing the row of the MAC data table comprising the infrequently used MAC address with MAC data comprising a new MAC address.

23. A method for transmitting data packets comprising compressed Media Access Control (MAC) data, comprising:
extracting one or more MAC addresses from packet headers comprised in the data packets;
storing a table of MAC data, the MAC data comprising MAC addresses;
providing compressed MAC data comprising one or more values associated with each of the one or more extracted MAC addresses respectively, each of the one or more values associated with MAC addresses being a pointer to a row in the table storing a MAC address equal to the respective MAC address;
modifying the data packets by adding the compressed MAC data to the data packets; and
transmitting the modified data packets,
wherein, replacing a row of the MAC data table comprising an identified MAC address with a new MAC address is optionally performed by identifying MAC addresses in the table as candidates for replacement, using counters corresponding to rows in the table, according to a data aging method comprising:
for each transmitted data packet, calculating a new value $cnt_n$ for each counter corresponding to a MAC address in the table of MAC data as follows:

$$cnt_n = cnt_{n-1} - (1/2^N) * cnt_{n-1} + (a \text{ value}) * x$$

where $cnt_{n-1}$ is a previous value of the counter, N is an integer in a range starting at 1 and ending at a number of bits representing the value of $cnt_{n-1}$, and if the transmitted data packet header includes a match for the MAC address x=1, else x=0; and replacing a row of the MAC data table comprising an identified MAC address with a new MAC address.

24. A method for point to point transmission of data packets comprising:
modifying and transmitting modified data packets by:
extracting one or more MAC addresses from packet headers comprised in data packets;
storing a table of MAC data, the MAC data comprising MAC addresses;
providing compressed MAC data comprising one or more values associated with each of the one or more extracted MAC addresses respectively, each of the one or more values associated with MAC addresses being a pointer to a row in the table storing a MAC address equal to the respective MAC address;
modifying the data packets by adding the compressed MAC data to the data packets; and
transmitting the modified data packets,
wherein, after the value associated with the MAC address comprised in the row has been used more than a set plurality of times, deleting a row of data in the MAC data table; and
receiving and modifying the modified data packets by:
receiving the modified data packets;
extracting the compressed MAC data from the received modified data packets; and
modifying the received modified data packets by removing the compressed MAC data in the received modified data packets, thereby producing twice-modified data packets substantially equal to the data packets.

25. The method according to claim 24 and further comprising:
further modifying the data packets by removing the one or more MAC addresses from the packet header;
providing one or more MAC addresses according to the one or more values associated with extracted MAC addresses comprised in the compressed MAC data; and
further modifying the received modified data packets by adding the one or more MAC addresses, to packet headers comprised in the received modified data packets.

* * * * *